(12) United States Patent
Strandell et al.

(10) Patent No.: US 8,266,307 B2
(45) Date of Patent: Sep. 11, 2012

(54) METHOD, SYSTEM, AND APPARATUS FOR ACCESS OF NETWORK SERVICES USING SUBSCRIBER IDENTITIES

(75) Inventors: Toni Strandell, Helsinki (FI); Elina Vartiainen, Helsinki (FI); Janne Kaasalainen, Helsinki (FI); Timo Pakkala, Espoo (FI)

(73) Assignee: Nokia Corporation, Espoo (FI)

( * ) Notice: Subject to any disclaimer, the term of this patent is extended or adjusted under 35 U.S.C. 154(b) by 538 days.

(21) Appl. No.: 12/152,081

(22) Filed: May 12, 2008

(65) Prior Publication Data

US 2009/0279682 A1 Nov. 12, 2009

(51) Int. Cl.
G06F 15/16 (2006.01)
(52) U.S. Cl. ...................................................... 709/229
(58) Field of Classification Search .................. 709/227, 709/229
See application file for complete search history.

(56) References Cited

U.S. PATENT DOCUMENTS

| | | | |
|---|---|---|---|
| 5,933,773 A * | 8/1999 | Barvesten | 455/411 |
| 6,112,078 A | 8/2000 | Sormunen et al. | |
| 2004/0260816 A1 | 12/2004 | Skog et al. | |
| 2005/0020308 A1* | 1/2005 | Lai | 455/558 |
| 2005/0107114 A1* | 5/2005 | Ocock | 455/550.1 |
| 2005/0148353 A1* | 7/2005 | Hicks et al. | 455/466 |
| 2005/0153741 A1* | 7/2005 | Chen et al. | 455/558 |
| 2006/0068756 A1 | 3/2006 | Aberg et al. | |
| 2006/0183489 A1* | 8/2006 | Modeo | 455/466 |
| 2006/0259361 A1 | 11/2006 | Barhydt et al. | |
| 2008/0013712 A1 | 1/2008 | Gopinath | |
| 2009/0129371 A1* | 5/2009 | Bishay | 370/352 |
| 2009/0328144 A1* | 12/2009 | Sherlock et al. | 726/2 |

FOREIGN PATENT DOCUMENTS

| EP | 1422899 | 8/2007 |
|---|---|---|
| WO | 2003105437 | 12/2003 |
| WO | WO 2005/004005 | 1/2005 |
| WO | 2006125829 | 11/2006 |

OTHER PUBLICATIONS

Do Van Thanh et al., "Future Management of Mobile Phones", Telektronikk, 3/4 2005.

* cited by examiner

Primary Examiner — John MacIlwinen
(74) Attorney, Agent, or Firm — Ditthavong Mori & Steiner, P.C.

(57) ABSTRACT

Associating user identities with a network service involves detecting, at a first device, a subscriber identity previously associated with a second device. The second device was used to register a user identity with a network service, and the user identity includes a phone number of the second device and an account identifier generated by the network service for use with the second device. The network service is accessed from the first device and the first device receives a new identifier from the service. The first device registers with the service via a communication channel that utilizes a phone number of the first device to establish communication. In response to the phone number of the first device matching the phone number of the second device, the first device accesses the service using the user identity associated with the second device.

23 Claims, 11 Drawing Sheets

US 8,266,307 B2

METHOD, SYSTEM, AND APPARATUS FOR ACCESS OF NETWORK SERVICES USING SUBSCRIBER IDENTITIES

FIELD OF THE INVENTION

This invention relates in general to computing devices, and more particularly to authenticating to network services via user computing devices.

BACKGROUND OF THE INVENTION

The use of networks is constantly evolving. Network applications such as email, instant messaging, and Web browsers have been combined and adapted in ways that allow users to communicate ever more effectively with people around the globe. Further, users are increasingly relying on mobile devices to interact with these network applications. Mobile devices have become ever more powerful due to the availability of low-power, high performance processors, inexpensive memory, and increasingly available and affordable mobile data networks.

There are many situations where a mobile device may interact with a service located on the Web. The data exchanged with these services may be particular to the user and/or the mobile device of the user. An example of user-specific data includes contact information, photos, and music. As users increasingly depend on mobile devices to carry personal data such as this, such devices may utilize network data backup and restore. In another example, cell phones and similar devices have taken advantage of remote device configuration and management systems in order to more easily configure the devices in accordance with the needs of a particular network. These network device configuration services often do not deal with private data or purchased content, and therefore may be tied to a specific device without regards to who is currently using the device.

As far as providing device-specific data, a network service may need access to a particular device type or configuration. In such a case, systems may use an identifier such as the International Mobile Equipment Identity (IMEI) to determine this data. In contrast, services that deal with private user data (or other important data, such as purchased content) may require that a particular user be identified and/or authenticated. Some situations (e.g., media sharing, or data synchronization between multiple devices) may require the pairing to the actual user (i.e. user's phone number). In addition, to be able to e.g. make a Voice Over Internet Protocol (VoIP) call (or other data-channel-based communication), a person initializing the call needs to know the receiver's VoIP address (or username etc.) to be able to place the call, even if the receiver's phone number is already known.

In order for these and other similar systems to work, there has to be a pairing between a user subscription to a particular service and devices that access the service. An example of pairing between a subscription and a device is the assignment of a telephone number to a cell phone. In that case, the subscriptions are generally maintained by mobile network operators, and only network operators can automatically set up a pairing between the subscription (e.g., telephone number) and user's device. A service external to the network operator generally cannot access this network operator data. An external service may be able to utilize a manually-entered pairing between a device and its phone number, such as by having the user enter a phone number on the device or the Web to identify the subscription. However, in such a case, when changing to a new device the account information needs to be input again.

To provide the best possible user experience and seamless usage of multiple devices, it would be desirable if a pairing between devices and service subscriptions is automatically formed independently of the service subscription provider network. Further, a change of device should be automatically detected when accessing such a provider network-independent service.

SUMMARY OF THE INVENTION

The present invention discloses a system, apparatus and method for access of network services. In one embodiment, a method involves detecting, at a first device, a subscriber identity previously associated with a second device that was used to register a user identity with a network service. The user identity includes a phone number of the second device and an account identifier generated by the network service for use with the second device. The method further involves accessing the network service from the first device and receiving at the first device a new identifier from the network service. The first device registers with the service via a communication channel that utilizes a telephone number of the first device to establish communication. In response to the telephone number of the first device matching the telephone number of the second device, the first device accesses the network service using the user identity previously associated with the second device.

In more particular embodiments, the communication channel that utilizes the telephone number of the first device may include a Short Message Service channel. Registering the user identity of the second device with the network service may further include accessing the network service from the second device, receiving the account identifier from the network service at the second device, and sending the account identifier in a message from the second device to the network service via a second communication channel that utilizes the telephone number of the second device to establish communication. In such a case, the telephone number is determined from the second communication channel. Further, in a variation of this case, registering the user identity of the second device with the network service may further involve receiving a confirmation identifier from the network service at the second device via the second communication channel, and registering the phone number and the account identifier of second device with the network service using the confirmation identifier.

In other more particular embodiments, the method further involves: a) receiving from the network service a request to replace the new identifier with the account identifier of the second device in response to the telephone number of the first device matching the telephone number of the second device; and b) associating, at the first device, the user identity with the account identifier of the second device. In another variation, accessing the network service involves maintaining a connection between the first device and the network service, and the method further involves a) receiving a request to connect to the first device from a peer of the first device, wherein the request is targeted to the network service using the telephone number of the first device; and b) joining a data session between the peer and the first device via the connection between the first device and the network service in response to receiving the request. The data session may include a Voice over Internet Protocol session.

In another more particular embodiment of the method, the subscriber identity may be detected via a Subscriber Identity Module (SIM), and in such case the SIM was moved from the second device to the first device. In another case, registering the first device with the network service further involves receiving the account identifier from the network service at the first device, and sending the account identifier in a message from the second device to the service via the communication channel that utilizes the telephone number of the first device to establish communication. In such a case, registering the first device with the network service may further involve: a) receiving a confirmation identifier from the network service at the first device via the communication channel that utilizes the telephone number of the first device; and b) registering the phone number and the new identifier of the first device with the network service using the confirmation identifier.

In another embodiment of the invention, a method involves associating a user identity of a first device with a network service of a packet switched network based on an account identifier generated by the network service and a phone number of the first device. A request to utilize the network service is received from a second device. A second account identifier that enables access to the network service is sent to the second device. A registration that includes the second account identifier is received via a communication channel that utilizes a telephone number of the second device. The telephone number of the second device is determined based on the communication channel, and the telephone number of the second device is determined to match the telephone number of the first device. The user identity of the first device is associated with the second device based on the determination that the telephone number of the second device matches the telephone number of the first device. The request to access the network service by the second device is fulfilled using the user identity of the first device.

In more particular embodiments, associating the user identity of the first device with the network service involves: a) sending the account identifier from the network service to the first device based on the first device initially accessing the network service; b) receiving, via a first communication channel that utilizes the telephone number of the first device, a message containing the account identifier; c) determining the telephone number of the first device via the first communication channel; and d) associating the user identity of the first device with the telephone number of the first device and the account identifier based on receiving the message. In such a case, associating the user identity of the first device with the network service may further involve: a) sending a confirmation identifier from the network service at the second device via the communication channel that utilizes the telephone number of the second device to establish communication; and b) registering the phone number and the account identifier of second device with the network service using the confirmation identifier.

In other more particular embodiments of the method, fulfilling the request to access the network service involves maintaining a connection between the second device and the network service. In such a case, the method further involves a) receiving a request from a peer device to connect to the second device, wherein the request is targeted to the network service using the telephone number of the second device; and b) joining a data session between the peer and the second device via the connection between the second device and the network service in response to receiving the request to connect to the second device.

In another embodiment of the invention, an apparatus includes at least one network interface capable of being coupled to a telephony network and a packet switched data network. The apparatus also includes a subscriber identity module having a subscriber identity previously associated with a second device. The second device was used to register a user identity with a network service, and the user identity includes a phone number of the second device and an account identifier generated by the network service for use with the second device. A processor of the apparatus is coupled to the network interface, and memory of the apparatus is coupled to the processor. The memory has instructions operable by the processor to cause the apparatus to: a) access the network service via the packet switched data network; b) receive a new identifier for the apparatus from the network service; c) register with the network service via the telephony network using a communication channel that utilizes a telephone number of the apparatus to establish communication (the telephone number of the apparatus includes the telephone number of the second device as defined by the subscriber identity module); and d) in response to the telephone number of the apparatus matching the telephone number of the second device, accessing the network service using the user identity associated with the second device.

In another embodiment of the invention, an apparatus includes at least one network interface capable of being coupled to a telephony network and a packet switched data network. A processor of the apparatus is coupled to the network interface, and memory of the apparatus is coupled to the processor. The memory has instructions that cause the processor to associate a user identity of a first device with a network service of the packet switched network based on a first account identifier and a phone number of the first device. The processor receives, from a second device, a request to utilize the network service and sends to the second device a second account identifier that enables access to the network service. The processor receives, via a communication channel that utilizes a telephone number of the second device to establish communications, a registration that includes the second account identifier. The processor determines the telephone number of the second device based on the communication channel, and also determines that the telephone number of the second device matches the telephone number of the first device. The processor associates the user identity of the first device with the second device based on the determination that the telephone number of the second device matches the telephone number of the first device. The processor further facilitates fulfilling the request to access the network service by the second device using the user identity of the first device.

In another embodiment of the invention, a computer-readable storage medium includes instructions which are executable by an apparatus for performing steps that include: a) accessing a network service via a packet switched data network; b) receiving a new identifier for the apparatus from the network service; c) registering with the network service via the telephony network using a communication channel that utilizes a telephone number of the apparatus to establish communication (the telephone number of the apparatus includes the telephone number of a second device as defined by a subscriber identity module that was transferred to the apparatus from the second device); and d) in response to the telephone number of the apparatus matching the telephone number of the second device, accessing the network service using the user identity associated with the second device.

In another embodiment of the invention, an apparatus includes: a) means for associating a user identity of a first device with a network service of a packet switched network based on an account identifier and a phone number of the first device; b) means for receiving, from a second device, a request to utilize the network service; c) means for sending to the second device a second account identifier that enables access to the network service; d) means for receiving, via a communication channel that utilizes a telephone number of the second device, a registration that includes the second account identifier; e) means for determining, based on the registration, that the telephone number of the second device matches the telephone number of the first device; f) means for associating the user identity of the first device with second device based on the determination that the telephone number of the second device matches the telephone number of the first device; and g) means for fulfilling the request to access the network service by the second device using the user identity of the first device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to methods, systems, and apparatus for enabling automatic user identity and/or authentication based on and associated between a device and a subscription identifier such as a telephone number. Generally, it may be desirable and/or necessary to authenticate users and their mobile devices to a network service that is accessed by the device. One way this authentication is currently done is to require users to register and create a username/screen name, and/or to type in their mobile device number. The service may then send an SMS containing a PIN code to the mobile device number. The user will then enter the PIN somewhere to verify the number. This may be done using a web browser on a personal computer (PC), the mobile device, or an application on the mobile device or PC. After creating the account, the users need to type in the created account information to an application in a mobile device in order to connect the mobile device to the correct account. If the user changes their device and/or phone number, they need to fill in the account information again.

Another example of how a user's subscription and the user's device may be linked is seen in device management systems. Generally, device management is a technique of managing devices (e.g., mobile devices) for purposes of configuring and updating the devices. In some device management systems, such as those used by mobile network operators, the linkage between users and devices is maintained in the form of operator subscription data.

For example, an International Mobile Subscriber Identity (IMSI) number is associated with Global System for Mobile communications (GSM) and Universal Mobile Telecommunications System (UMTS) network mobile phones to uniquely identify those devices. The IMSI number is stored in a Subscriber Identity Module (SIM) card, which is accessible by the user. However, only the network operator knows the mapping between the IMSI and the phone number. Thus, this data is only usable for the particular devices and phone numbers that are a part of the network, and the linkage between the device and the subscription is not available to external network entities. The IMSI alone could be used to map certain functions to a device, e.g., moving an account info from one device to another, but would not provide means for more advanced operations described hereinbelow, such as routing Voice Over Internet Protocol (VoIP) calling based on a phone number.

Figure 1:
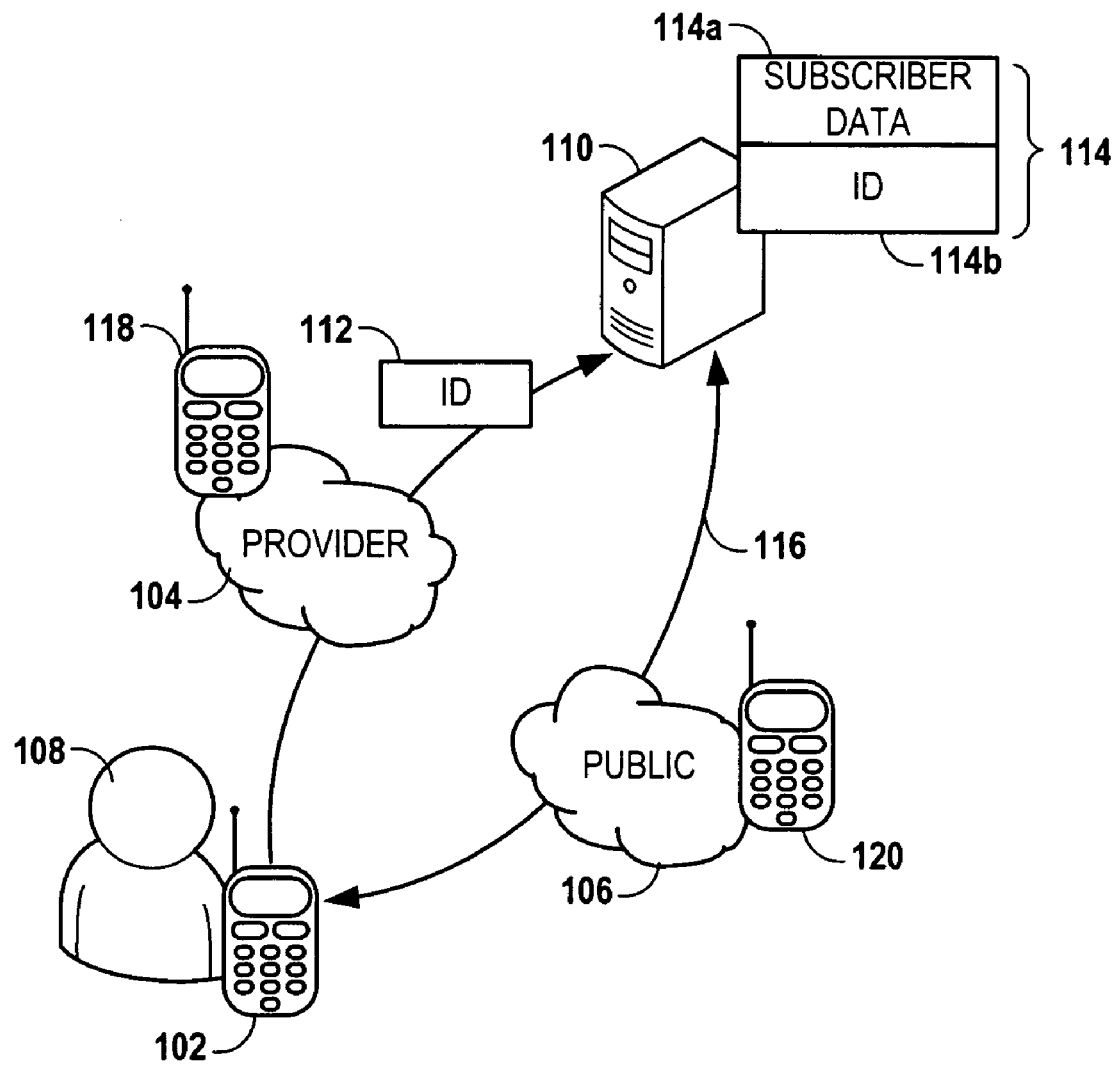
FIG. 1 is a block diagram illustrating a system according to embodiments of the invention.

What is needed, then, is a way to automatically set up the pairing of a user with a device in a network operator-independent fashion without any user input. One manner of doing this is shown in FIG. 1, which shows a block diagram of a system to an embodiment of the invention. A user device 102 is capable of operating over a mobile service provider network 104 and a public data network 106 such as the Internet. A user 108 of device 102 wishes to use a network service 110 (e.g., Internet-based service) that requires authentication. Generally, the authentication requires that the user 108 provide an identifier that allows the service 110 to reliably and accurately discern the identity of the user 108. The identity may be tied to the device 102, but the identity should be automatically transferable to a replacement device that performs the same user services as device 102.

In one embodiment of the invention, a message 112, such as Short Messaging Service (SMS) message, is sent to the network service 110 via the provider network. The message 112 uses a connection path that allows determining subscriber data (e.g., user's phone number) that uniquely identifies the user 108 on the provider network 104, and may be globally unique. The message 112 is used to create a pairing 114 on the service 110 between a user subscription and the device 102. A communication such as an SMS message contains the phone number 114a as part of the connection setup, and thus is an automatic way to determine the phone number and pair the phone number with data (e.g., ID 114b) sent by way of the message 112. That pairing 114 is used to make a mobile application interact with the service without requiring any input, registration or configuration from the user 108. From the user's point of view, the mobile device 102 and the service 110 configure and work together seamlessly and transparently. All the settings needed are fetched automatically from the device 102 and the service 110.

It will be appreciated that the phone number in an SMS can be falsified, similar to the forging of caller-ID phone numbers or sender email addresses. In such cases, the callers/senders address can be set to appear to the receiver of the call/message to be different from the actual sending address. In recognition of this, critical systems might also have the service 110 send a confirmation SMS (not shown) back to the mobile device 102 in response to the incoming SMS 112 in order to verify the phone number. The confirmation SMS can contain some key/credentials needed to access the service 110. It will be appreciated that the confirmation response also be based on other telephony-based communication channels as described herein, including voice, fax, touch-tone signals, MMS, etc.

In the illustrated system, the service 110 can automatically authenticate the device 102 for purposes such as engaging in a network service session 116 via the public network 106. Such a session 116 may be used for data backup/retrieval, messaging (e.g., email, Internet text messages), news, e-commerce, e-banking, navigation, streaming media, and any other network service that may require authentication. The service 110 may also act as an intermediary between the user device 102 and other devices 118, 120 of respective provider and public networks 104, 106. For example, the service 110 may allow the devices 102, 118, 120 to access each other via peer-to-peer communications using different combinations of identifiers associated with the networks 104, 106 and the service 110. For example, pairing 114 maintained by the service 110 may facilitate contacting one of the devices 102, 118, 120 via the subscriber data 114a based only on knowledge of one of the device ID 114b and subscriber ID 114a. Some other ID, such as a user login associated with the service 110, might also be used to access the paired data 114.

In one configuration, a mobile application is used to manage user identities that are to be associated with computing devices. When the user 108 initiates a mobile application (e.g., by installing it and/or launching a preinstalled application) that automatically communicates with a service 110 through a data channel (GPRS, 3G, WLAN, etc.), the mobile application retrieves an identifier (ID) from the service 110 over the data channel. The ID may be generated for this purpose only, and may be stored along with the account information. The application sends an SMS 112 containing the ID, and optionally other relevant information (e.g., device IMEI code), to the service 110. The service 110 creates a pairing 114 between the assigned ID and the phone number of the user (e.g., the sender's number extracted from the SMS call setup data), without any user input, registration or configuration. Before creating the pairing 114, the service 110 might optionally send an SMS back to the device 102 to verify the subscription number 114a. This may not needed if the incoming number can be trusted (may depend on the provider 104), or if the service 110 does not involve exchanging private, sensitive, or monetarily valuable data.

In response to the pairing 114 of the phone number and assigned ID, an account can be automatically created for the user 108. The account may be identified by the assigned ID 114b and/or the user's phone number 114a. The mobile application uses the assigned ID (or other account identifier) whenever connecting to the service 110. If the user 108 switches to a new device that retains the same subscription identifier (e.g., telephone number), the account can automatically accessed from the new device without any additional actions on the part of the user 108. For example, if the user 108 transfers a Subscriber Identity Module (SIM) card from the old device 102 to a new device, the new device creates a data connection to the service 110, retrieves a new ID and sends it in an SMS to the service 110. The service 110 notices that the number is already tied to an account and updates the device's ID via the data channel. This automatic update does not require a transfer of a SIM card; such an update can occur in response any transfers of subscriptions to new/different devices, such as activating the new device via the Internet, changing to a new provider network and retaining the same phone number, having multiple devices that are all authorized to use the same phone number (or share use some other subscription identifier), etc.

Embodiments of the invention may be used in a number of scenarios. For example, the system may be used to back up user's contacts (e.g. to a network backup service). If the user later switches to a new device; the users' contacts and all other data (e.g., settings, multimedia, text messages, etc.) that were backed up to the service can be transferred to the new device automatically, e.g., without user input, registration or configuration.

If the system is used to publish or share data to other people/users, then embodiments of the invention can be used to automatically transfer the user's phone number to the service. The phone numbers can then be matched to other people's contact book entries' phone numbers. In this way, contents of the contact book can be used to define people with whom to share. The user may choose to reveal his/her true identity to only those people who are in the user's contact book, and/or those others who have the user in their contact books. If those contact's utilize a similar authentication service, they can have access to open communication sessions of user 108 on public network 106 based on a message originating from their listed phone number. In such a case, users can define network sharing permissions based only on the phone numbers of participating users, and those permissions are valid from any device of those contacts that use the authorized phone number.

If a system requires the user to register, using e.g. a Web user interface, and the user is required to fill in a mobile phone number, the embodiments of the invention can be used to automatically configure an application in the mobile device to authenticate the user upon connecting to the service. A set of services may co-operate so that first the user registers to a "core" service (e.g. Nokia™ Ovi), and later enables another service within the ecosystem (e.g. Nokia™ Music Store). If the latter, more specific service, requires inputting a phone number (e.g., on a web based registration form), the specific service can use the existing profiles/configurations and access the mobile device via the core service using phone number based authentication.

In another scenario, the user may make a VoIP call (or any other communication, such as messaging) using a cellular operator provided phone number as the identifier (or address). An application registers the number with a VoIP access account, and VoIP calls can be made without requiring the people to register or create a separate VoIP address. Ease of registering for these and other hosted services and be increased by potentially auto-filling information about the user by searching them from other peoples' contact books. In such case, user would only need to confirm that the collected information is correct and if not, make the needed changes.

Figure 2A:
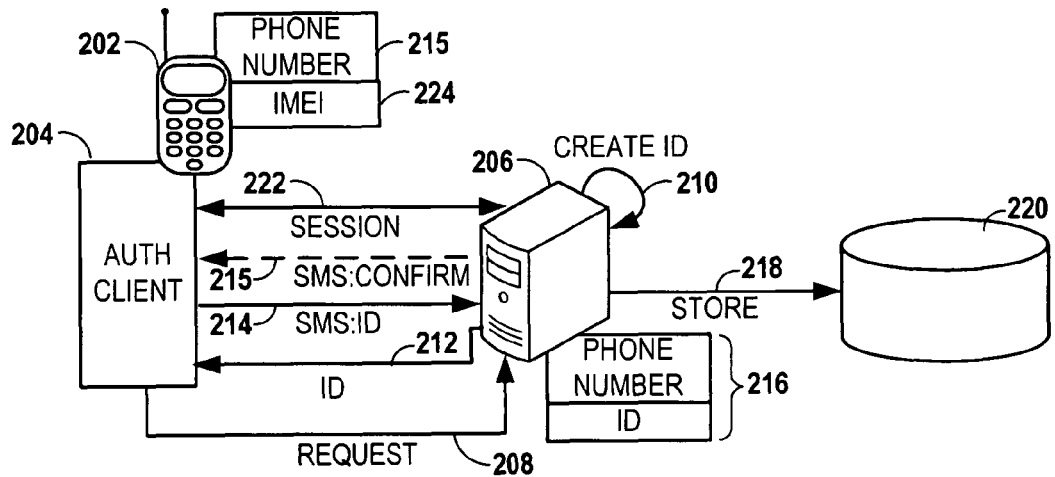
FIG. 2A is a block diagram illustrating service registration according to an embodiment of the invention.

In reference now to FIG. 2A, a block diagram illustrates authentication interactions according to an embodiment of the invention. A user's mobile device 202 includes a software component 204 (e.g., an authentication client) that facilitates automatically authenticating to a network service 206. When the software 204 is run on the mobile device 202, it connects to a service 206 via a cellular data connection/WLAN and requests 208 an identifier for the device 202. The service 206 creates 210 an identifier for the device 202 and the ID 212 is transferred back to the device 202 using the data channel. The device sends an SMS message 214 containing the ID 212 to the service 206. It will be appreciated that the SMS message 214 may automatically include the phone number 215 of the device 202 as part of establishing the SMS communication with the service 206. The service 206 receives the SMS 214, extracts the ID 214 and phone number 215 of the message sender.

The service 206 may optionally send a confirmation SMS message 215 after determining the phone number contained in message 214. The confirmation message 215 may contain a code that is automatically parsed and used for sending a confirmation reply (not shown). Such a code may be the same as the ID 212, or may be some other code used just for confirmation. The reply may be similar to SMS 214 and/or may involve sending a message over a packet switched network. In response to successful confirmation (or automatically, if no confirmation is necessary) the service 206 creates a pairing 216 between the phone number 215 (e.g., the user's subscription identifier) and the ID 212 that was provided to the device 202. This pairing 216 may be stored 218 in a database 220 for later use.

The stored pairing 216 may be accessed later when the user later initiates a session 222 with the service 206, or when someone else initiates a communication of some sort with the user using the user's phone number 215 as identifier. The client software 204 (or other software, such as program that invokes the session 222) can send the ID and/or phone number from the pair 216 as an authentication prior to starting the session. This authentication can be used to allow access to data on the device 202 and/or service 206, and can be used to recall session state, user configuration settings, and other data associated with past or present sessions. The subsequent authentication may be sent via a channel where the phone number is used to establish communication (e.g., via SMS communication 214) or by an IP network-only communication. In the latter case, the phone number and ID may be sent as separate variables, either in clear text or encrypted. In other cases, the phone number and ID may be combined into a single variable, e.g., by using a hash function and/or encryption key to form a single variable that can be compared to similarly formed variables in the database 220.

It will be appreciated that many variations are possible in light of the teachings above. For example, instead of first connecting 208 to the service over a data channel (e.g., packet switched network connection), the mobile device 202 could send an SMS message to the service, and the service would reply with an SMS containing the account ID. In another variation, the ID 212 could be replaced with the mobile device's IMEI code 224, in which case the device 202 would not need to be in contact with the service 206 prior to sending the SMS 214. A drawback of using the IMEI code 224 is that the pairing 216 may be only applicable to a single device in some scenarios. In other cases, it may be possible for the database 220 and device software 204 to use an IMEI code 224 from the first device 202 that registers, and thereafter re-use the IMEI 224 even if the phone number is transferred to a different device. However, using a service specific ID 212 that is tied to a user account (instead of a single device) and that can be used from several devices may ease of implementation in the software 204, service 206, and database.

In yet another implementation, the phone number 215 can be obtained via another communication channel besides SMS. For example, a voice/data call may be used, and the ID 212 is sent via the call. The id could be sent as a fax message, modem command, touch tone combination, embedded in caller ID information, or by any other means providing adding information to a call. The phone number 215 and ID 214 may be provided to the service 206 automatically, both at the time of first access 208 and for other, later sessions 222.

Figure 2B:
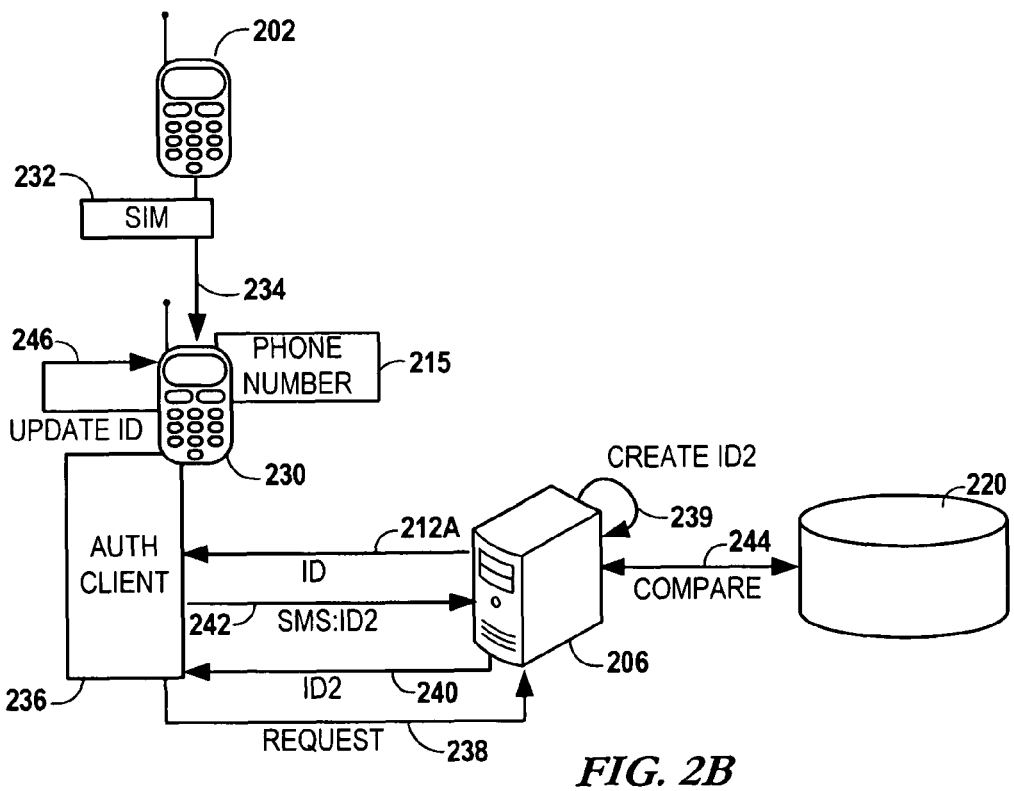
FIG. 2B is a block diagram illustrating transfer of service registration to a different device according to an embodiment of the invention.

In reference now to FIG. 2B, a block diagram illustrates how the authentication obtained by device 202 can be used by another of the user's devices 230 according to an embodiment of the invention. When the user of device 202 switches to another device 230, a SIM card 232 (or other subscription key) is transferred 234 to the new device 230. This transfer 234 causes the device 230 to be assigned the same number 215 as was previously assigned to device 202. After transfer 234 of the SIM 232, software component 236 of the device 230 retrieves a newly created 239 identifier (ID2 240) from the service 206 in response to a request 238, similar to the scenario described above in reference to FIG. 2A. Also similar to the above scenario, the component 236 sends the ID2 240, e.g., via an SMS 242 sent to the service 206.

Upon receiving the SMS 242, the service 206 compares 244 the message sender's phone number 215 to its stored phone number/ID pairs in database 220, and notices a match for the phone number 215. Based on this match, the service 206 sends the ID 212A (corresponding to original ID 212 assigned to device 202 in FIG. 2A) to the mobile device 202 through the data channel. Alternatively, the ID 212A may be sent via an SMS sent to the phone number 215. In this way, the message 212A may act as a confirmation sequence similar to confirmation 215 in FIG. 2A to protect against forged phone numbers. In such a case, the client 236 may perform further actions to complete the confirmation, such as sending another SMS or data message to the service 206 indicating that the SMS message 212A was successfully received.

In response to receiving the ID 212A, the mobile device 230 updates 246 its stored ID2 240 to the previous ID 212, 212A, thus coupling the device 230 with the previously established service account. In an alternate arrangement, the service 206 may retain the new ID2 204 and update its database 220 with the new ID2 240 paired with the phone number 215. In such a case, the service 206 may either delete or retain the old pairing 206. Also, the service 206 may delay any changing of the pairing 206 based on a confirmation response (e.g., in response to ID 212A sent to the phone number 215). In either event, the stored user account data is associated with whatever pairings are placed in the database 220.

Although it is convenient to handle all transactions as described above via a mobile device, there are situations where a user may hear about and register with a service from a non-mobile device, such as a home or work PC. In reference now to FIG. 3, a registration scenario according to an embodiment of the invention using a non-mobile or non-telephonic device is shown.

Generally, user 302 has access to personal mobile device 304 and another computing device 306 (e.g., laptop computer). The user 302 may first register 308 to a service 310 manually (e.g., via a Web page accessed from computer 306) and provides phone number 312 of device 304 as part of this registration 308. In response to the registration 308, the user 302 may be provided with a registration ID 314, either via computer 306, mobile device 304, or some other means (e.g., mailing, telephone call, etc.). The ID 314 may be provided and stored automatically in the mobile device 304 (e.g., via an SMS, email, etc., sent to device 304) or the user could enter the ID 314 manually. The service 310 also creates and stores 316 a pairing 318 of the ID/number and stores it in a database 320.

Thereafter, the user 302 connects to the service 310 with the mobile device 304 over a data channel (e.g., WLAN, WAP). A mobile authentication application 322 executing on mobile device 304 accesses the service 310, and may automatically form and send an SMS 324 (or similar message) as needed to access the service 310. The service 310 matches 326 the ID and phone number with the pairing 318 in the database 320. This may authenticate the user 302 so that a session 328 and other authorized interactions may occur. Or, before authenticating the user 302, the service 310 may further send a confirmation message 330 to the registered phone number 312 of the client 322. The confirmation message 330 may confirm that the phone number 312 actually belongs to device 304, and may contain data that enables establishing the session 328. Such an additional confirmation 330 may occur every time or just the first time the device 304 accesses the service 310.

In another arrangement, the mobile device 304 may access the service 310 without being previously configured with the ID 314. For example, after registering 308 via computer 306, the user 302 accesses the service 310 via client 322 running on terminal 304. As shown and described above in relation to FIG. 2B, the service 310 may provide a new ID (not shown) to the client 322 which is used to send an SMS with the new ID. The service matches the phone number 312 sent with this new ID, and the service 310 determines that the phone number 312 is previously matched with ID 314. The service 310 recognizes that this phone number 312 is associated with a previously created account. In response, the services 310 may cause the mobile device 304 to update its locally stored ID with ID 314, and/or the service may modify the database 320 to associate the user 302 with any combination of the original ID 314 and the newly assigned ID.

Figure 3:
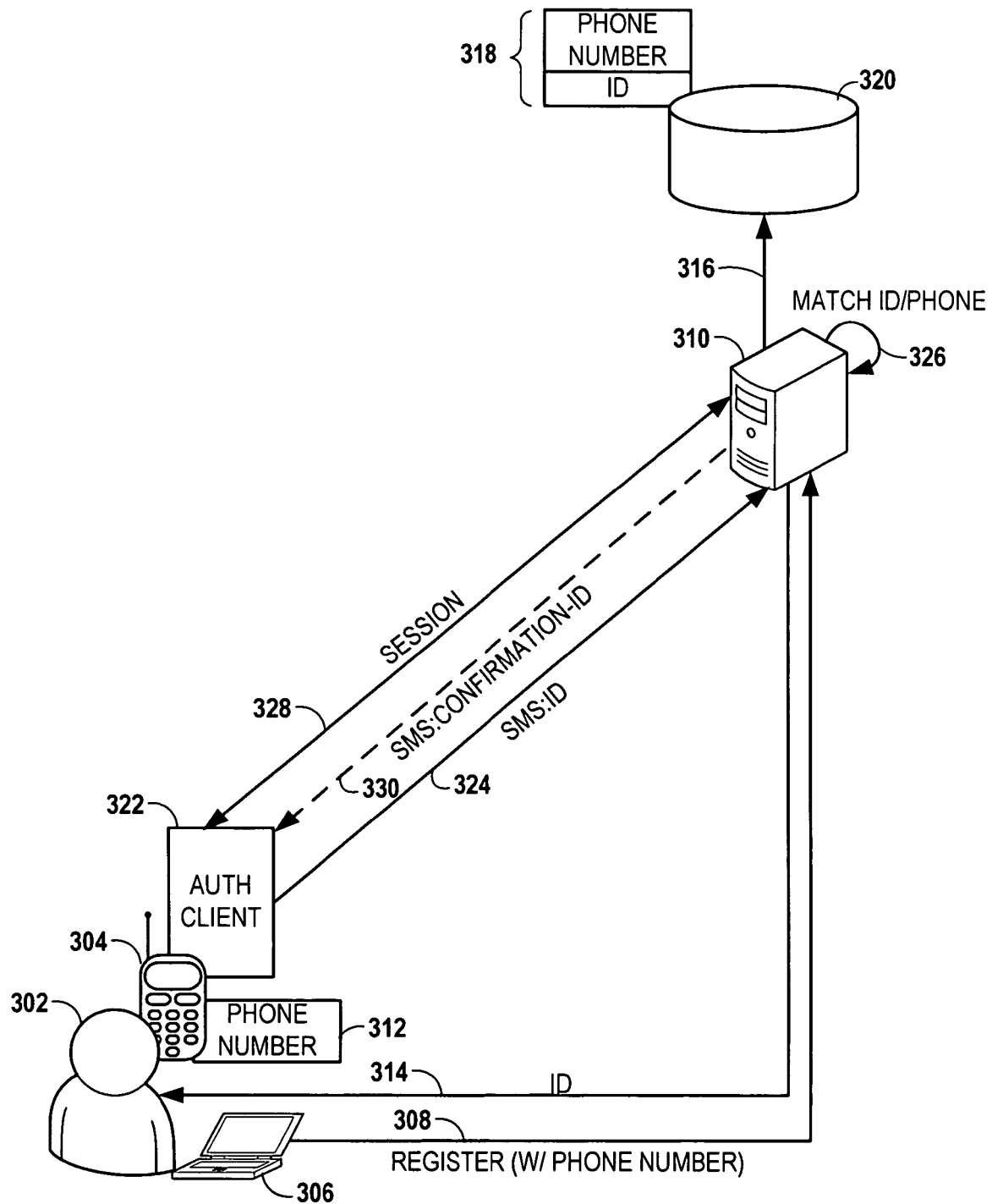
FIG. 3 is a block diagram illustrating an alternate registration according to an embodiment of the invention.

As shown in FIGS. 2A, 2B, and 3, registration occurs with a single "service," that may represented as any combination of a physical machine, login, Uniform Resource Locator (URL), Internet Protocol (IP) address, or other technical aspect commonly associated with a service. It will be appreciated that as network services often branch out into new and different areas of use. For example, some "portal" Web applications start out by offering basic services such as Internet search, email, news, etc. However, registered users that primarily use one of these "core" applications also may find out that the registration with the core services enables them to access other services offered by the same provider, such as discussion groups, travel booking, photo sharing, etc. Thus there may be natural relationships between different services that may be able to utilize a single authentication/identity associated with some other service.

Figure 4:
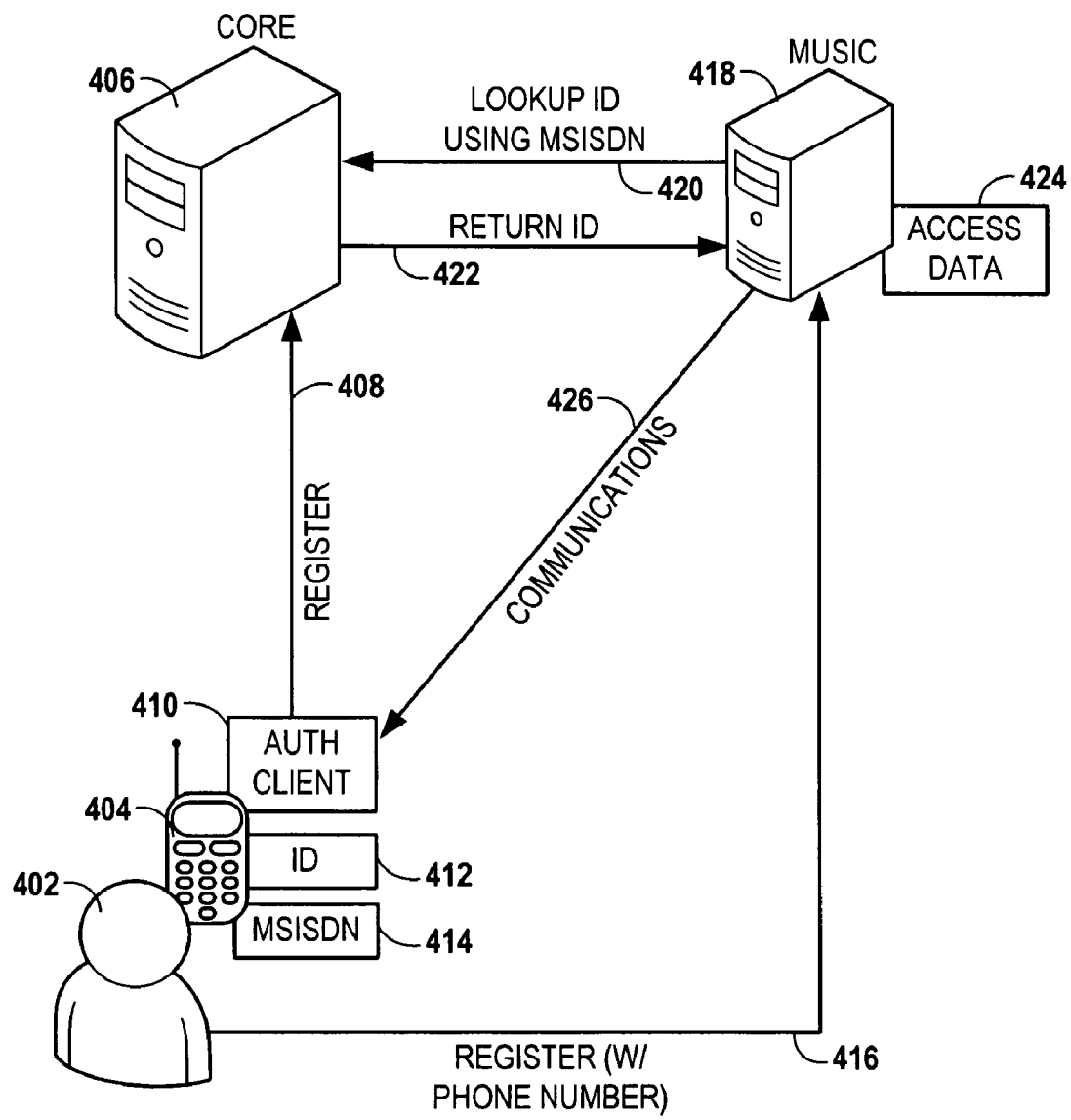
FIG. 4 is a diagram illustrating a shared group management user interface according to an embodiment of the invention.

In reference now to FIG. 4, a block diagram shows an example of how interrelated services may utilize a common authentication according to an embodiment of the invention. A user 402 has a mobile device 404 that may be registered 408 with a core service 406, e.g., using an authentication client application 410. Generally, the core service 406 may be any user-accessible service that involves user registration. The user 402 may regularly visit the core service 406, and as a result there may be an advantage in using automatic authentication as described herein to make use of the core service 406 easier.

During the registration 408, an ID 412 is agreed upon between the user device 404 and the core service 406. As in previously described scenarios, the ID 412 may be sent from the device 404 to the service 406 via a data connection that utilizes the phone number of the device 404, here represented as Mobile Subscriber Integrated Services Digital Network Number (MSISDN) 414. The service 406 can thereby map the ID 412 and the MSISDN 414 and associate them with user 402, and thereafter use this mapping/pairing to identify a data channel to the device 404.

As some point after registration 408 with the core service 406, the user 402 may register 416 (e.g., using a Web form) to a second service 418, a music store in this example. The user 402 provides the MSISDN 414 during the registration 416. The MSISDN 414 is used by the music store 418 to lookup 420 the user's account in core service 406. The core service 406 returns 422 the ID to the music store 418, thereby providing the music store 418 access to the user's device 404 and/or other data of interest maintained by the core service 406. This is represented by access data 424, which can be used to initiate a data channel 426 with the device 404.

The channel 426 may be established either directly between device 404 and music service 418, or indirectly via core service 406. It may be desirable to ask for confirmation to establish and use the data channel 426 for the music store 418, to at least provide an opt-out, and also to prevent malicious registrants from establishing/using the data channel 426. The music store 418 could use the data channel 426 for a number of purposes, such as sending a free song or some DRM keys or other configuration data to all new registrants, send discount coupon/info to the user's device, or other reminders. The core service 406 may also provide a link to the music service 418, thereby enabling easy access to the music service 418 from the frequently accessed core service 406.

In the previous scenario, an identifier is used in combination with a phone number to associate/authenticate one or more devices of a user with a network service. These concepts may also be applicable to group communications. In reference now to FIG. 5, a block diagram illustrates a use of phone number based group authentication according to an embodiment of the invention. A set of users 502-506, having respective devices 502a-506a, register to a service 508 by agreeing on an ID that is unique to each user (e.g., ID 510 associated with user 502) and sending the ID in an SMS (e.g., registration 512 for user 502) to the service 508. In response to the registrations, the service 508 creates ID-to-phone number mappings 514 for each user.

At some point, user 502 initiates a call 516 (e.g., via VoIP) to user 503. The mobile device 502 of the caller 502 might have an open data channel to the service 508, or may instantiate one. In such a case, a data application (not shown) that makes the call 516 sends the ID 510 and the recipient's phone number 518 (e.g., selected from a standard phonebook) to the service 508. The service 508 maps 520 the caller's ID 510 to the caller's phone number 522, and the recipient's phone number 518 to the recipient's ID 524. The service 508 locates the recipient's data channel (e.g., a listening connection on an IP network) and, based on the ID 522 contained in the call request 516, the service 508 connects a VoIP call 526 using the data channels of devices 502a, 503a.

Figure 5:
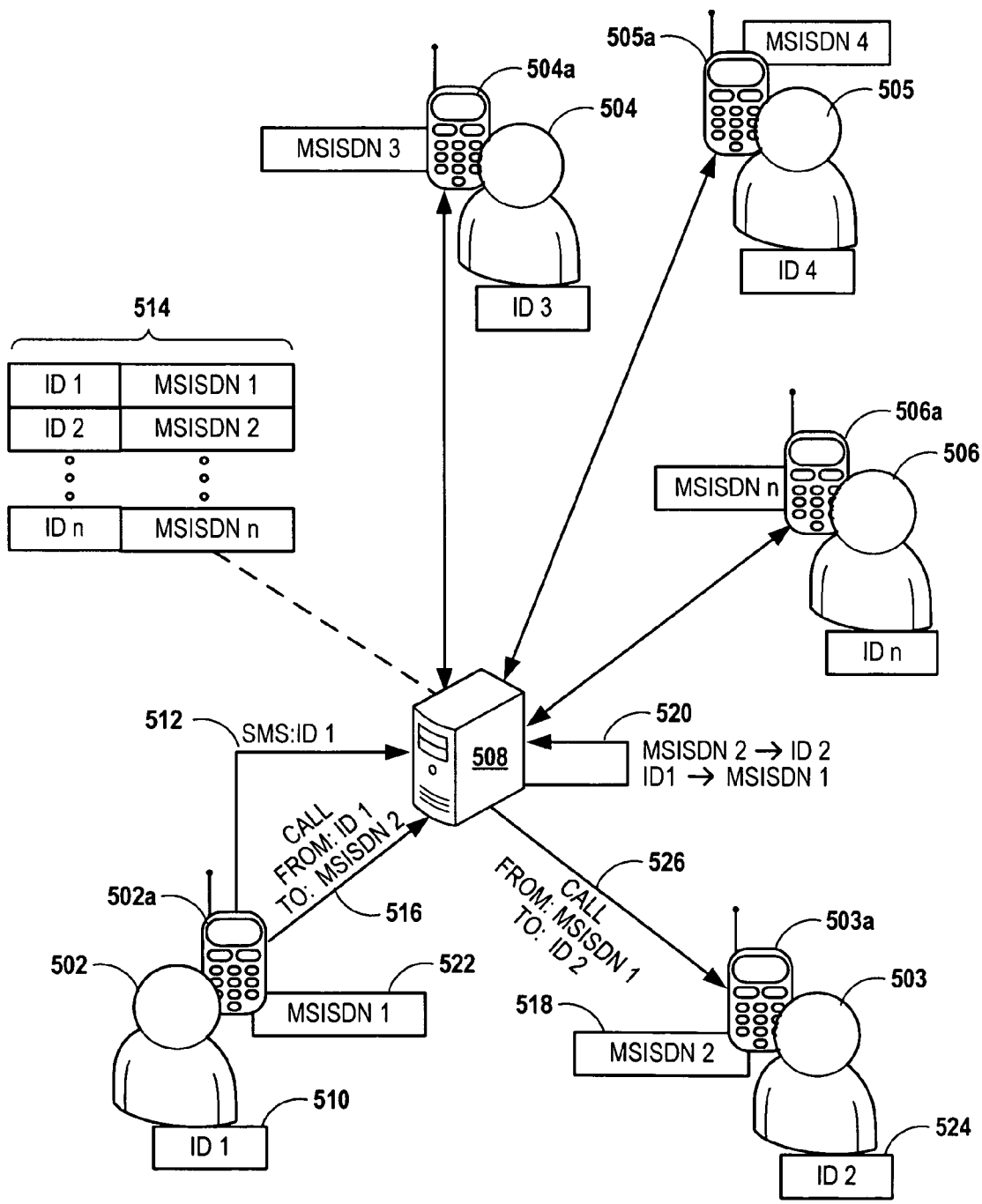
FIG. 5 is a block diagram illustrating the use of service registration to make a network-enabled voice calls according to an embodiment of the invention.
Figure 6A:
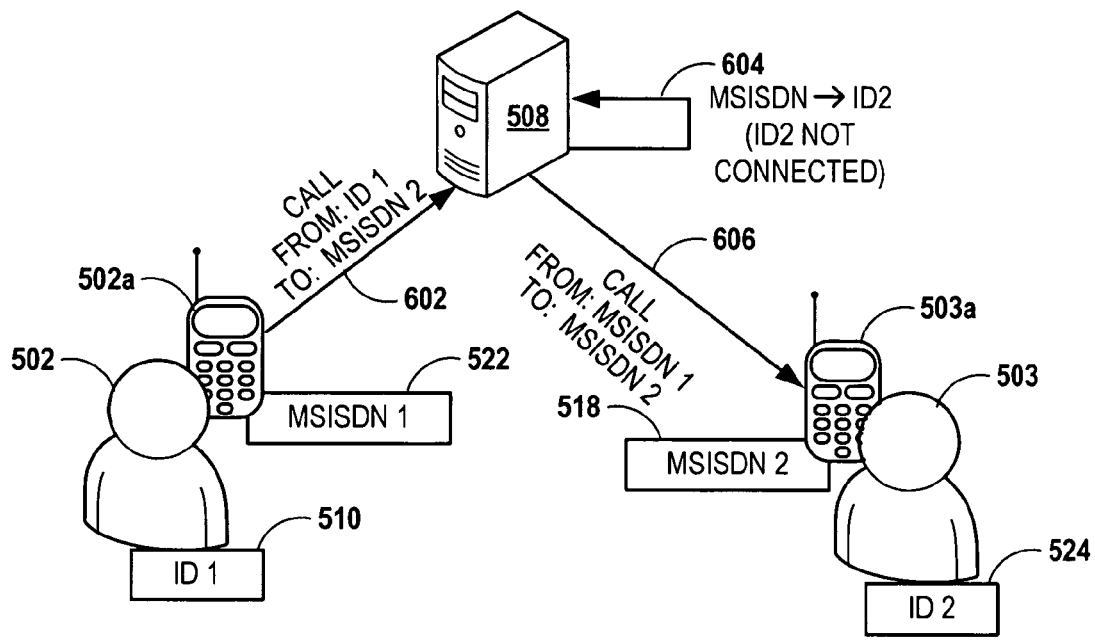
FIGS. 6A-6B are block diagrams illustrating alternate connection scenarios in making network enabled voice calls according to an embodiment of the invention.
Figure 6B:
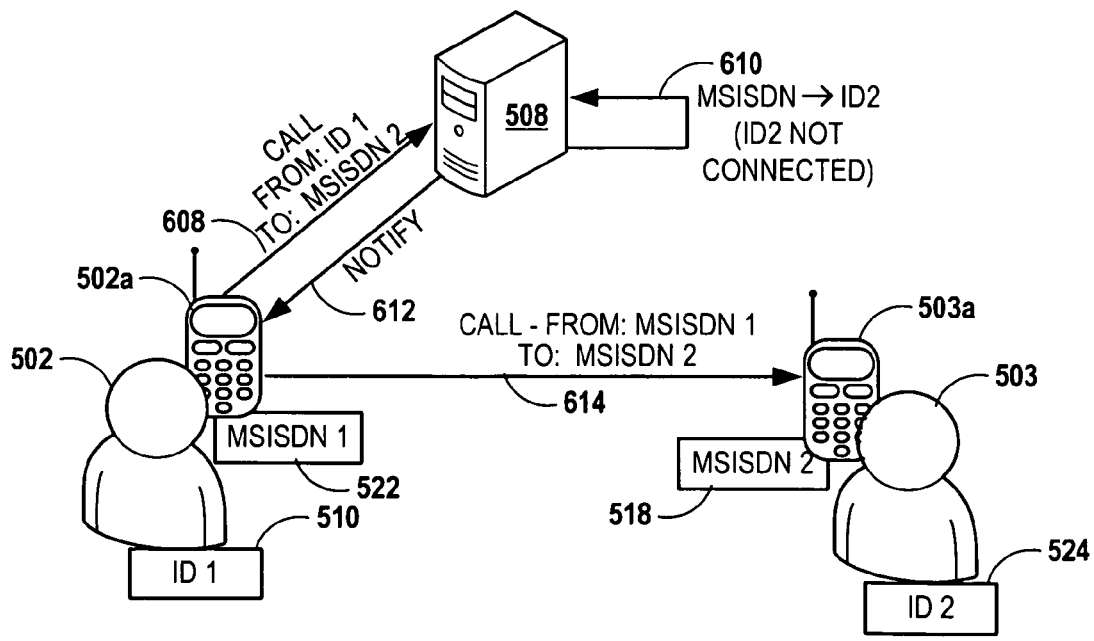

A number of variations are possible regarding the call setup scenario shown in FIG. 5. Two of these variations are shown in FIGS. 6A and 6B, where like reference symbols are used to indicate features analogous to those shown in FIG. 5. In FIG.

6A, in response to call request 602, the service 508 determines 604 recipient device 503a does not have an open data channel with the service 508. As a result, although the leg 602 of the call from the device 502a to service 508 is routed as a VoIP call, the leg 606 of the call from the service 508 to the recipient 503a is made using a cellular service. A similar situation is shown in FIG. 6B, where, in response to call request 608, the service 508 determines 610 recipient device 503a does not have an open data channel with the service 508. In this case, the service 508 notifies 612 the calling device 502a, which may or may not be shown to the user 502. In response to the notification 612, the device 502a, either automatically or manually initiate a direct call 614 to the recipient device 503a via another channel (e.g., via cellular networks).

A network authentication as described herein may offer a number of advantages. For example, if the account does not require any identity information (e.g., anonymous account), the user may not need to perform any configuration of user account information. Such as system prevents errors due to mistyping on the mobile device, since there is no typing. The user's account information can be automatically transferred when switching devices, and the user does not need to have an access to a Web browser to register or switch devices. The user can use contact book entries (e.g., phone numbers) when communicating with other people over non-telephony data channels (e.g., VoIP, email, and other messaging and communication means) without having to discover identifiers (e.g., addresses) associated with those channels.

Many types of apparatuses may be used for network communications as described herein. Mobile telephony devices are particularly useful for communications because such devices are assigned fixed numbers for use via mobile and landline telephone networks. In reference now to FIG. 7, an example is illustrated of a representative mobile computing arrangement 700 capable of carrying out operations in accordance with embodiments of the invention. Those skilled in the art will appreciate that the exemplary mobile computing arrangement 700 is merely representative of general functions that may be associated with such mobile devices, and also that landline computing systems similarly include computing circuitry to perform such operations.

The processing unit 702 controls the basic functions of the arrangement 700. Those functions associated may be included as instructions stored in a program storage/memory 704. In one embodiment of the invention, the program modules associated with the storage/memory 704 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 700 via data signals, such as being downloaded electronically via one or more networks, such as the Internet and an intermediate wireless network(s).

The mobile computing arrangement 700 may include hardware and software components coupled to the processing/control unit 702 for performing network data exchanges. The mobile computing arrangement 700 may include multiple network interfaces for maintaining any combination of wired or wireless data connections. In particular, the illustrated mobile computing arrangement 700 includes wireless data transmission circuitry for performing network data exchanges.

This wireless circuitry includes a digital signal processor (DSP) 706 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 708, generally coupled to an antenna 710, transmits the outgoing radio signals 712 and receives the incoming radio signals 714 associated with the wireless device. These components may enable the arrangement 700 to join in one or more networks 715, including mobile service provider networks, local networks, and public networks such as the Internet.

The mobile computing arrangement 700 may also include an alternate network/data interface 716 coupled to the processing/control unit 702. The alternate network/data interface 716 may include the ability to communicate via secondary data paths using any manner of data transmission medium, including wired and wireless mediums. Examples of alternate network/data interfaces 716 include USB, Bluetooth, Ethernet, 802.11 Wi-Fi, IRDA, Ultra Wide Band, WiBree, etc. These alternate interfaces 716 may also be capable of communicating via the networks 715, or via direct peer-to-peer communications links.

The processor 702 is also coupled to user-interface elements 718 associated with the mobile terminal. The user-interface 718 of the mobile terminal may include, for example, a display 720 such as a liquid crystal display and a transducer 722. The transducer 722 may include any sensing device capable of producing media, such as any combination of text, still pictures, video, sound, etc. Other user-interface mechanisms may be included in the interface 718, such as keypads, speakers, microphones, voice commands, switches, touch pad/screen, graphical user interface using a pointing device, trackball, joystick, vibration generators, etc. These and other user-interface components are coupled to the processor 702 as is known in the art.

The program storage/memory 704 typically includes operating systems for carrying out functions and applications associated with functions on the mobile computing arrangement 700. The program storage 704 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 704 of the mobile computing arrangement 700 may also include software modules for performing functions according to embodiments of the present invention.

In particular, the program storage/memory 704 includes a telephony and packet switched network interface software 724, 726. These interfaces 724, 726 interact with hardware (e.g., network interface 716, processor 702, DSP 706, transceiver 708) to provide functions associated with respective telephony and packet switched data networks. For example, the telephony interface 724 may be utilized by telephony applications 728 such as SMS 730, Multimedia Message Service 732, and voice 734. The telephony applications 728 may utilize a SIM interface for verifying subscriber identity via locally coupled SIM hardware 735.

The packet switched interface 726 may be utilized by packet switched applications 736, such as VoIP 738, Web browsing 740, and media access/rendering 742. The storage/memory 704 includes an authentication client 744 that provides the ability for automatically authenticating and/or associating an identity with a network service 746. The authentication client 744 may initiate authentication actions with the service 746 via the packet switched interface 726, receive data from the service 746 such as an account ID, and send the ID back to the service 746 via the telephony interface. The client 744 may directly access the interfaces 724, 726 to perform these actions, or may do so indirectly via respective applications 728, 736 (e.g., using application program interfaces of the applications 728, 736 and/or device operating system). The client 744 may retain the authentication in persistent memory, such as database 748 which may store the account IDs provided as part of authentication with the service 746.

Figure 7:
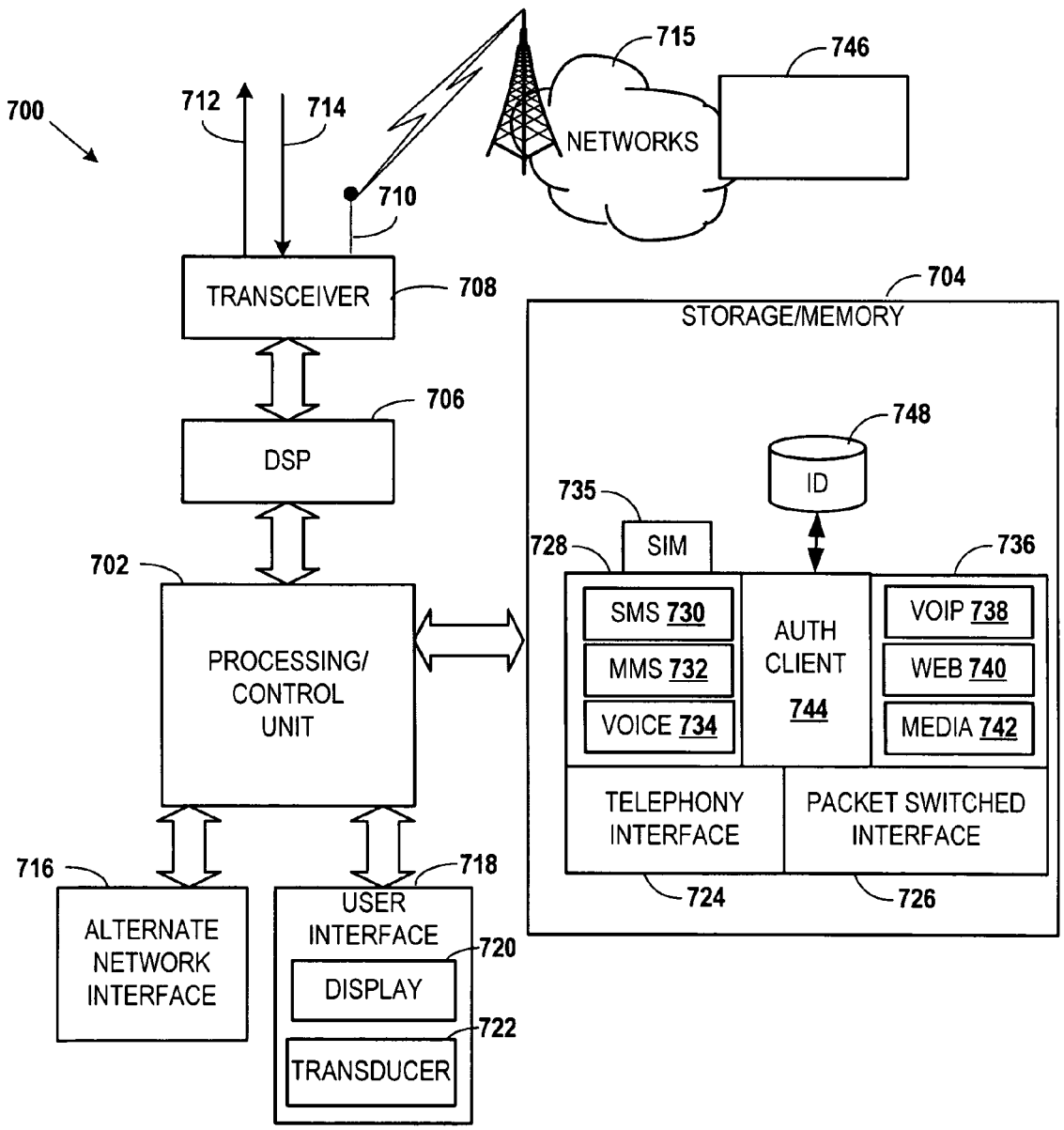
FIG. 7 is a block diagram of a mobile device according to an embodiment of the invention.

The mobile computing arrangement 700 of FIG. 7 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Figure 8:
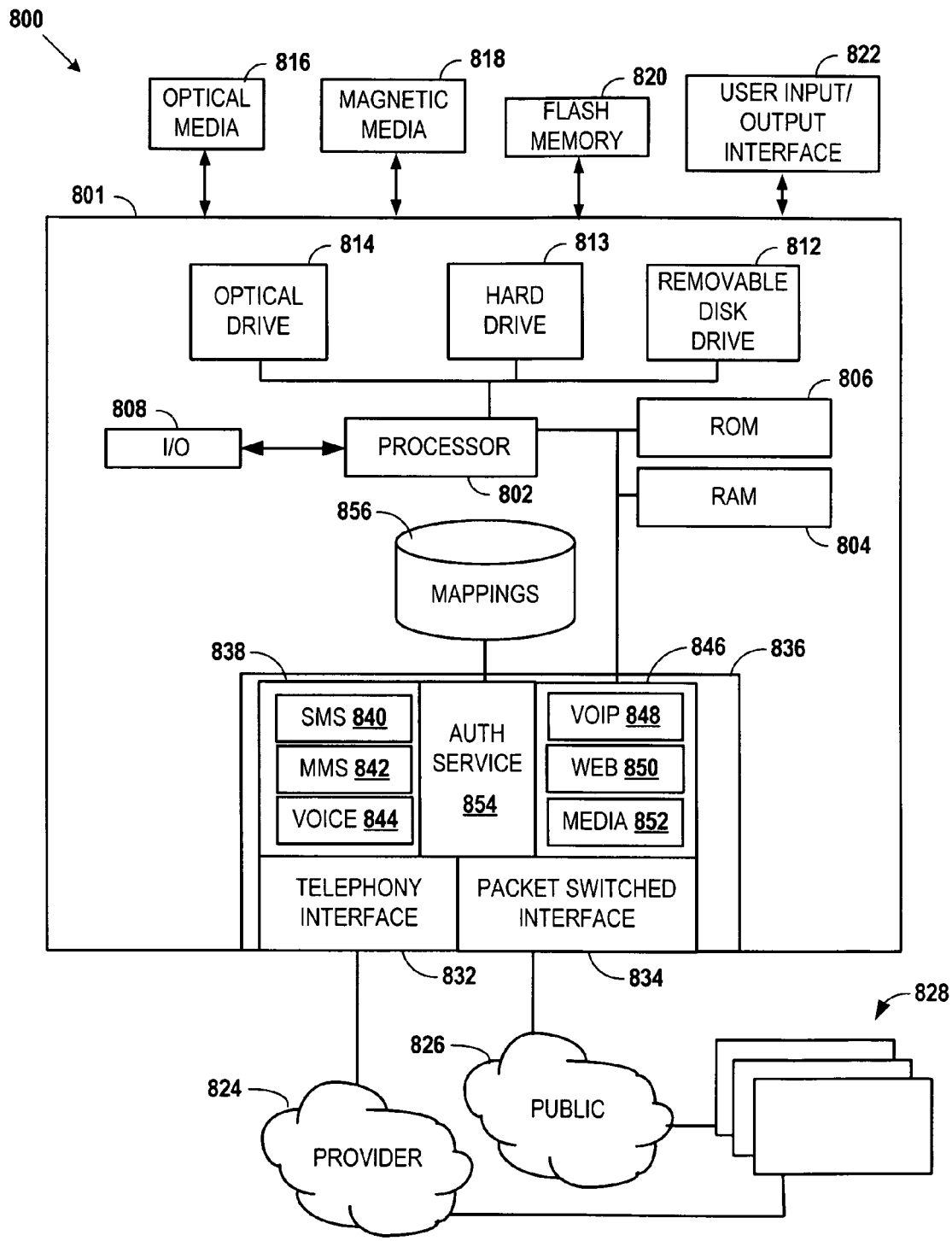
FIG. 8 is a block diagram of a network server apparatus according to an embodiment of the invention.

In reference now to FIG. 8, a block diagram provides details of a network service 800 that provides authentication according to embodiments of the invention. The service 800 may be implemented via one or more conventional computing arrangements 801. The computing arrangement 801 may include custom or general-purpose electronic components. The computing arrangement 801 includes a central processor (CPU) 802 that may be coupled to random access memory (RAM) 804 and/or read-only memory (ROM) 806. The ROM 806 may include various types of storage media, such as programmable ROM (PROM), erasable PROM (EPROM), etc. The processor 802 may communicate with other internal and external components through input/output (I/O) circuitry 808. The processor 802 carries out a variety of functions as is known in the art, as dictated by software and/or firmware instructions.

The computing arrangement 801 may include one or more data storage devices, including removable disk drives 812, hard drives 813, optical drives 814, and other hardware capable of reading and/or storing information. In one embodiment, software for carrying out the operations in accordance with the present invention may be stored and distributed on optical media 816, magnetic media 818, flash memory 820, or other form of media capable of portably storing information. These storage media may be inserted into, and read by, devices such as the optical drive 814, the removable disk drive 812, I/O ports 808 etc. The software may also be transmitted to computing arrangement 801 via data signals, such as being downloaded electronically via a network 826, such as the Internet. The computing arrangement 801 may be coupled to a user input/output interface 822 for user interaction. The user input/output interface 822 may include apparatus such as a mouse, keyboard, microphone, touch pad, touch screen, voice-recognition system, monitor, LED display, LCD display, etc.

The service 800 is configured with software that may be stored on any combination of memory 804 and persistent storage (e.g., hard drive 813). Such software may be contained in fixed logic or read-only memory 806, or placed in read-write memory 804 via portable computer readable storage media such as read-only-memory magnetic disks, optical media, flash memory devices, etc. The software may also placed in memory 806 by way of data transmission links coupled to input-output busses 808. Such data transmission links may include wired/wireless network interfaces, Universal Serial Bus (USB) interfaces, etc.

The software generally includes instructions that cause the processor 802 to operate with other computer hardware to provide the service functions described herein. The computing arrangement 801 may be coupled to other computing clients 828 via mobile services provider networks 824 and public packet switched networks 826. In particular, the computing arrangement includes network interfaces 830, 832 for interacting with clients 828 via respective networks 824, 826. The network interfaces 832, 834 may include a combination of hardware and software components, including media access circuitry, drivers, programs, and protocol modules.

For purposes of illustration, the operation of the service 800 is described in terms of functional circuit/software modules that interact to provide particular results. Those skilled in the art will appreciate that other arrangements of functional modules are possible. Further, one skilled in the art can readily implement such described functionality, either at a modular level or as a whole, using knowledge generally known in the art. The computing arrangement 801 includes processor executable instructions 836 for carrying out tasks of the service 800. These instructions may include telephony service applications 838 such as SMS 840, MMS 842, and voice 844. The instructions may also include packet switched services 846 such as VoIP 848, Web 850, and media access 852.

An authentication service module 854 authenticates/identifies clients 828 when the clients 828 access the packet switched services 846. The authentication service 854 may receive identifiers from clients 828 via one or more telephony applications 838. The telephony applications 828 may be able to determine subscription identifiers (e.g., phone numbers) associated with the clients 828, and thereby enable the service 854 to look up ID number / phone number mappings in a database 856. These various identifiers can be used for purposes described herein, including initial account setup, confirming telephony identifiers using callback messages, detecting new user devices that use the same phone number as other devices associated with existing accounts, routing of cellular and VoIP call, etc.

Figure 9:
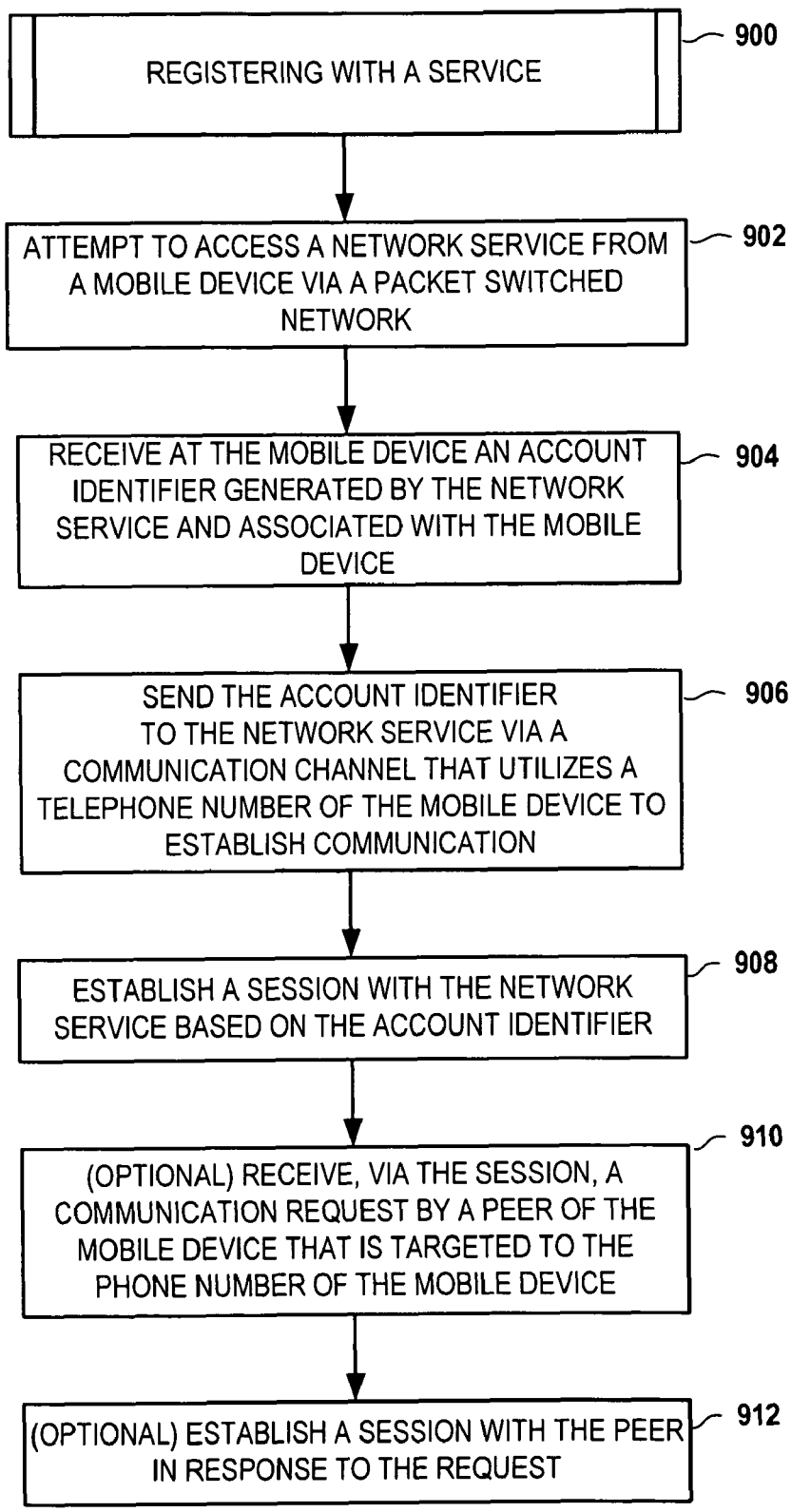
FIGS. 9-11 are flowcharts illustrating procedures according to embodiments of the invention.

In reference now to FIG. 9, a flowchart illustrates a procedure 900 according to one embodiment of the invention. A mobile device attempts 902 to access a network service via a packet switched network. An account identifier is received 904 at the mobile device. The account identifier is associated with the mobile device and is generated by the network service. The mobile device sends 906 the account identifier to the network service via a communication channel that utilizes a telephone number of the mobile device to establish communication (e.g., SMS). A session is established 908 between the mobile device and network service based on the account identifier.

The mobile device may optionally receive 910, via the session, a communication request by a peer of the mobile device. The request is targeted to the phone number of the mobile device, and the requestor need not have any knowledge of the account identifier of the mobile device. In response to the request, the session may be established 912 with the peer. In a similar situation where the session is no longer established, the session may be established using an alternate communications path, e.g., via the phone number of the mobile device.

Figure 10:
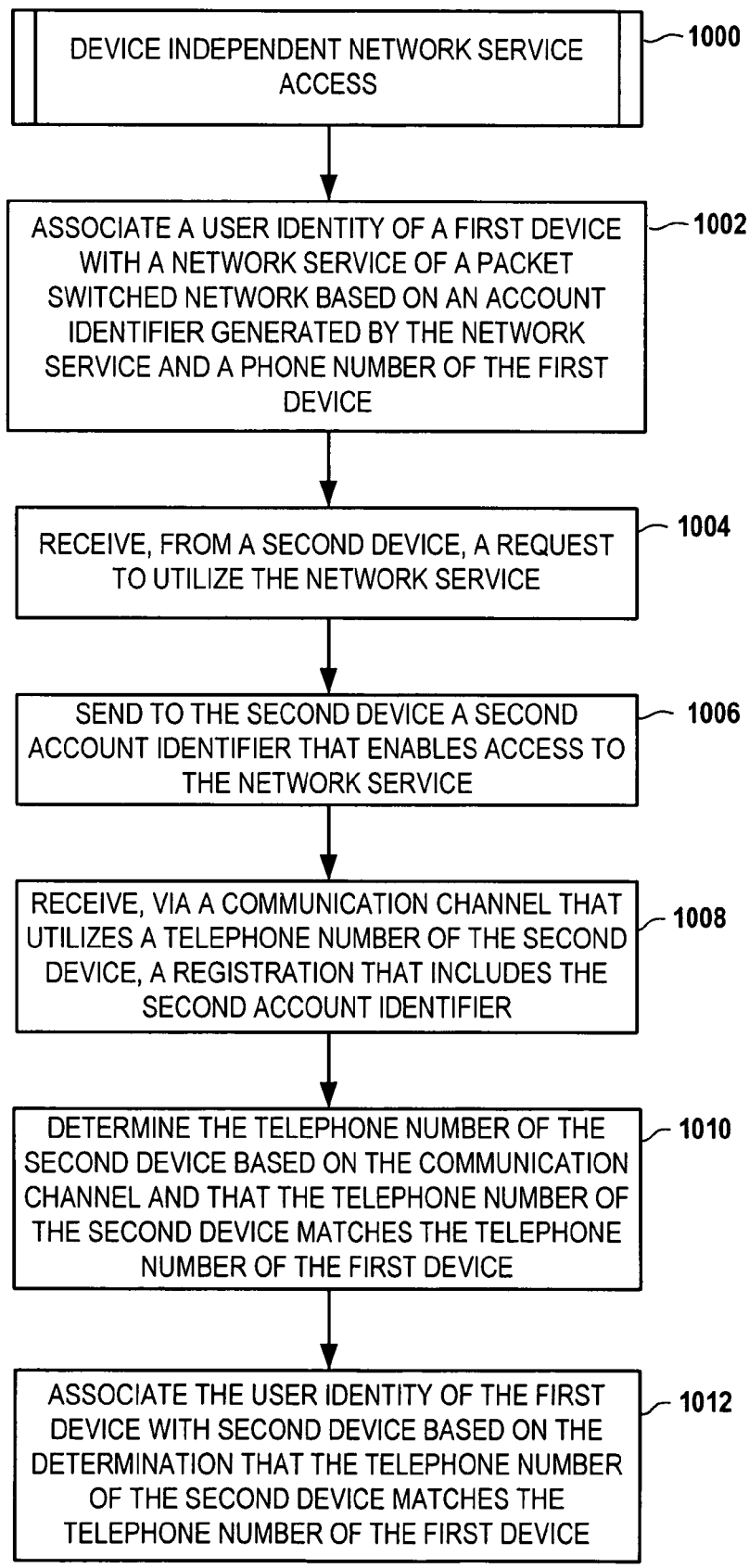

In reference now to FIG. 10, a flowchart illustrates a procedure 1000 for device independent network access according to an embodiment of the invention. The procedure 1000 involve associating 1000 a user identity of a first device with a network service of a packet switched network based on an account identifier generated by the network service and a phone number of the first device. The service receives 1004, from a second device, a request to utilize the network service, and sends 1006 to the second device a second account identifier that enables access to the network service.

The service receives 1008, via a communication channel that utilizes a telephone number of the second device, a registration that includes the second account identifier. The service determines 1010 the telephone number of the second device based on the communication channel, and further that the telephone number of the second device matches the telephone number of the first device that the telephone number of the second device matches the telephone number of the first device. Based on this determination 1010, the service associates 1012 the user identity of the first device with second device.

Figure 11:
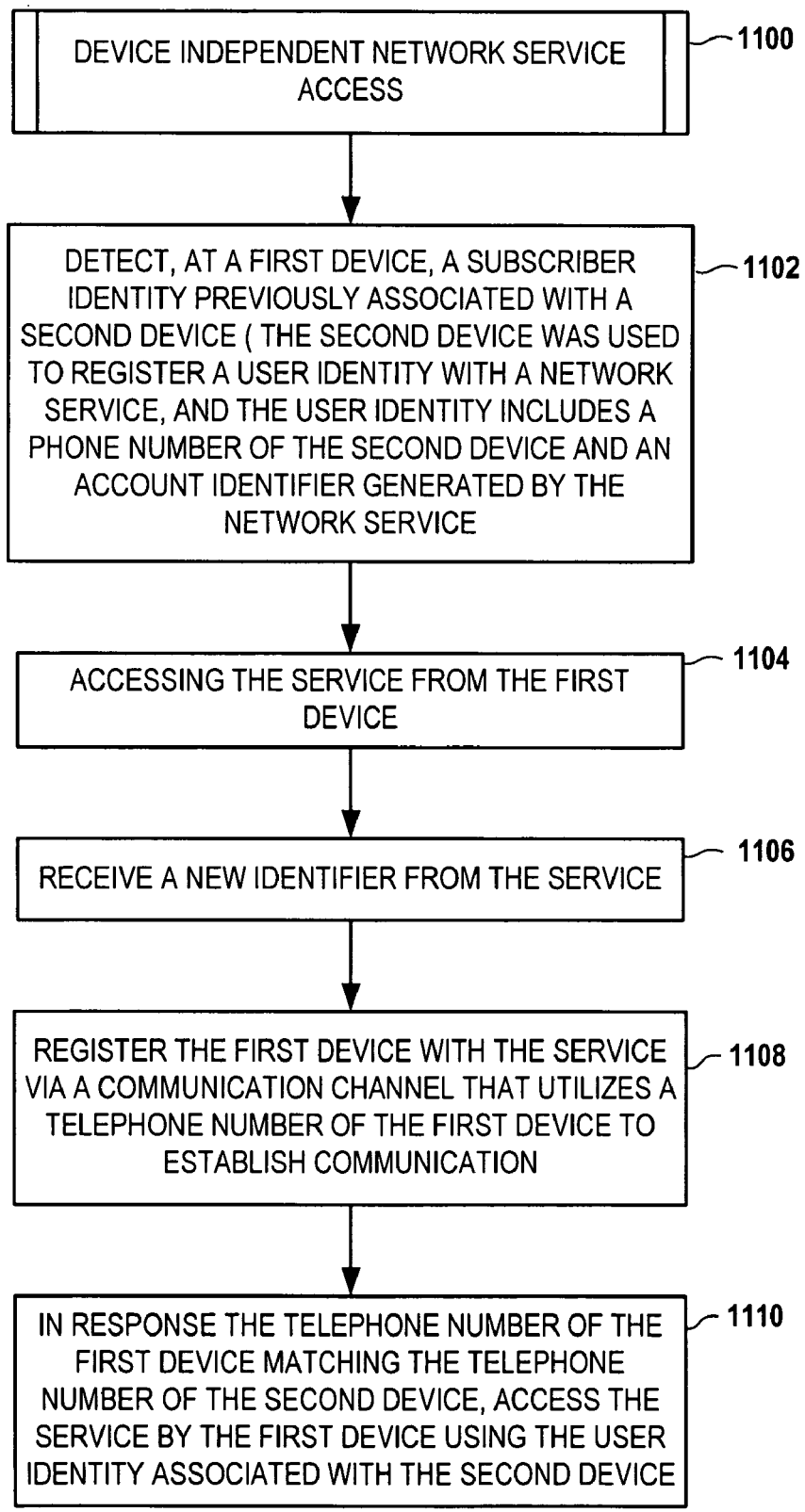

In reference now to FIG. 11, a flowchart illustrates a procedure 1100 for device independent network access according to an embodiment of the invention. At a first device, a subscriber identity previously associated with a second device is detected 1102. The second device was used to register a user identity with a network service, and the user identity includes a phone number of the second device and an account identifier generated by the network service. The first device accesses 1104 the service, and receives 1106 a new identifier from the service. The first device registers 1108 with the service via a communication channel. The first device then accesses 1110 the service using the user identity associated with the second device in response to the telephone number of the first device matching the telephone number of the second device. The determination of matching telephone numbers may be performed at the service, and the first device may receive a request from the service to assume the user identity of the second device as part of accessing 1110 the service.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method, comprising:
    detecting, at a first device, a subscriber identity of a network operator previously associated with a phone number of a second device, wherein the second device was used to register a user identity with a network service external to the network operator, and wherein the user identity comprises the phone number of the second device and an account identifier generated by the network service for use with the second device;
    receiving a new identifier in response to accessing the network service from the first device;
    registering the first device with the service using the new identifier via a communication channel that utilizes a phone number of the first device to establish communication; and
    in response to the phone number utilized by the communication channel matching the phone number of the second device, accessing the network service by the first device using the user identity previously associated with the second device.

2. The method of claim 1, wherein the communication channel that utilizes the phone number of the first device comprises a Short Message Service channel.

3. The method of claim 1, wherein registering the user identity of the second device with the network service comprises:
    accessing the network service from the second device;
    receiving the account identifier from the network service at the second device; and
    sending the account identifier in a message from the second device to the network service via a second communication channel that utilizes the phone number of the second device to establish communication, wherein the phone number is determined from the second communication channel.

4. The method of claim 3, wherein registering the user identity of the second device with the network service further comprises:
    receiving a confirmation identifier from the network service at the second device via the second communication channel; and
    registering the phone number and the account identifier of the second device with the network service using the confirmation identifier.

5. The method of claim 1, further comprising:
    in response to the phone number of the first device matching the phone number of the second device, receiving from the network service a request to replace the new identifier with the account identifier of the second device; and
    associating, at the first device, the user identity with the account identifier of the second device.

6. The method of claim 1, wherein accessing the network service comprises maintaining a connection between the first device and the network service, the method further comprising:
    receiving a request to connect to the first device from a peer of the first device, wherein the request is targeted to the network service using the phone number of the first device; and
    joining a data session between the peer and the first device via the connection between the first device and the network service in response to receiving the request.

7. The method of claim 6, wherein the data session comprises a Voice over Internet Protocol session.

8. The method of claim 1, wherein the subscriber identity is detected via a Subscriber Identity Module (SIM) that was moved from the second device to the first device, wherein subscriber identity comprises a portion specific to the network operator, and wherein the network service does not have access to the operator-specific portion of the subscriber identity.

9. The method of claim 1, wherein registering the first device with the network service further comprises:
    receiving the account identifier from the network service at the first device; and
    sending the account identifier in a message from the second device to the service via the communication channel that utilizes the phone number of the first device to establish communication.

10. The method of claim 9, wherein registering the first device with the network service further comprise:
    receiving a confirmation identifier from the network service at the first device via the communication channel that utilizes the phone number of the first device; and
    registering the phone number and the new identifier of the first device with the network service using the confirmation identifier.

11. A method comprising:
   associating a user identity of a first device with a network service based on an account identifier generated by the network service and a phone number of the first device, wherein the network service is external to a network operator that is associated with the phone number;
   receiving, from a second device, a request to utilize the network service;
   sending to the second device a new identifier that enables access to the network service;
   receiving, via a communication channel that utilizes a phone number of the second device, a registration that includes the new identifier;
   associating the user identity of the first device with the second device based on a determination that the phone number of the second device matches the phone number utilized by the communication channel; and
   fulfilling the request to access the network service by the second device using the user identity of the first device.

12. The method of claim 11, wherein the communication channel that utilizes the phone number of the second device comprises a Short Message Service channel.

13. The method of claim 11, wherein associating the user identity of the first device with the network service comprises:
   sending the account identifier from the network service to the first device based on the first device initially accessing the network service; and
   receiving, via a first communication channel that utilizes the phone number of the first device, a message containing the account identifier;
   determining the phone number of the first device via the first communication channel; and
   associating the user identity of the first device with the phone number of the first device and the account identifier based on receiving the message.

14. The method of claim 13, wherein associating the user identity of the first device with the network service further comprises:
   sending a confirmation identifier from the network service at the second device via the communication channel that utilizes the phone number of the second device to establish communication; and
   registering the phone number and the account identifier of the second device with the network service using the confirmation identifier.

15. The method of claim 11, further comprising in response to the phone number of the first device matching the phone number of the second device, sending to the second device a request to replace the new identifier with the account identifier of the first device.

16. The method of claim 11, wherein fulfilling the request to access the network service comprises maintaining a connection between the second device and the network service, the method further comprising:
   receiving a request from a peer device to connect to the second device, wherein the request is targeted to the network service using the phone number of the second device; and
   joining a data session between the peer and the second device via the connection between the second device and the network service in response to receiving the request to connect to the second device.

17. The method of claim 16, wherein the data session comprises a Voice over Internet Protocol session.

18. An apparatus comprising:
   at least one network interface capable of being coupled to a network of a network operator;
   a processor coupled to the network interface; and
   memory coupled to the processor and having instructions operable by the processor to cause the apparatus to,
      associate a user identity of a first device with a network service based on an account identifier and a phone number of the first device, wherein the network service is external to the network operator that is associated with the phone number;
      receive, from a second device, a request to utilize the network service;
      send to the second device a new identifier that enables access to the network service;
      receive, via a communication channel that utilizes a phone number of the second device to establish communications, a registration that includes the new identifier;
      associate the user identity of the first device with the second device based on a determination that the phone number of the second device matches the phone number utilized by the communication channel; and
      facilitate fulfilling the request to access the network service by the second device using the user identity of the first device.

19. The apparatus of claim 18, wherein associating the user identity of the first device with the network service comprises:
   sending the account identifier to the first device based on the first device initially accessing the network service; and
   receiving, via a first communication channel that utilizes the phone number of the first device, a message containing the account identifier;
   determining the phone number of the first device via the first communication channel; and
   associating the user identity of the first device with the phone number of the first device and the account identifier based on receiving the message.

20. The apparatus of claim 19, wherein associating the user identity of the first device with the network service further comprises:
   sending a confirmation identifier from the second device via the first communication channel;
   receiving the confirmation identifier from the second device; and
   registering the phone number and the account identifier of the second device with the network service using the confirmation identifier.

21. The apparatus of claim 18, wherein facilitating fulfilling the request to access the network service comprises maintaining a connection between the second device and the network service, the method further comprising:
   receiving a request to connect to the second device from a peer of the second device, wherein the request is targeted to the phone number of the second device; and
   joining a data session between the peer and the second device via the connection between the second device and the network service in response to receiving the request to connect to the second device.

22. A non-transitory computer-readable storage medium comprising:

instructions which are executable by an apparatus for performing steps that include:
- accessing a network service that is external to a network operator associated with a phone number of the apparatus;
- receiving a new identifier for the apparatus from the network service;
- registering with the network service via the network operator using a communication channel that utilizes the phone number of the apparatus to establish communication, wherein the phone number of the apparatus comprises the phone number of a second device as defined by a subscriber identity of the network operator that was transferred to the apparatus from the second device, and wherein the network service associates an existing user identity with the phone number; and
- in response to the phone number utilized by the communication channel matching the phone number of the second device, accessing the network service using the existing user identity.

23. The non-transitory computer-readable storage medium of claim 22, wherein the subscriber identity comprises a portion specific to the network operator, and wherein the network service does not have access to the operator-specific portion of the subscriber identity.

* * * * *